April 28, 1964  A. MALCHAIR  3,131,064
VEGETAL COMPOSITION, METHOD AND APPARATUS FOR ITS PRODUCTION
Filed April 4, 1961  3 Sheets-Sheet 1
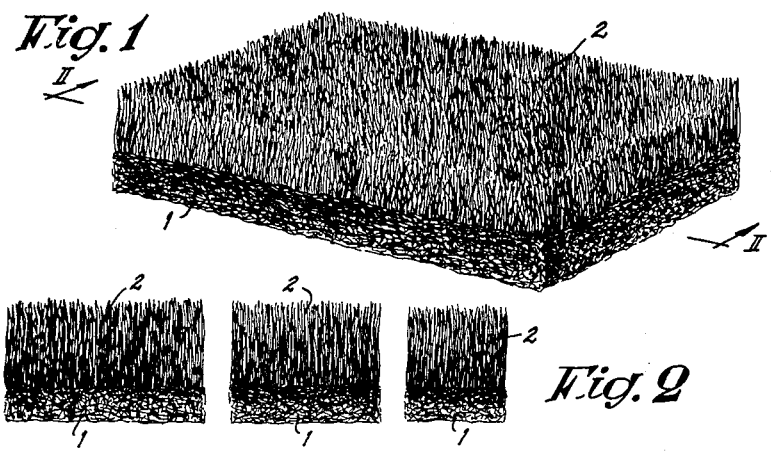
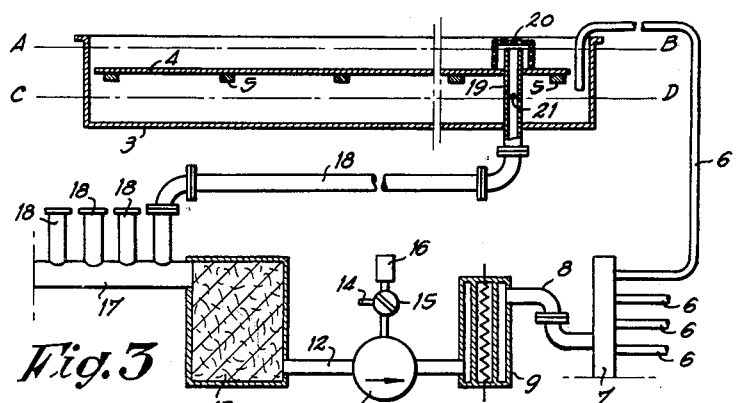
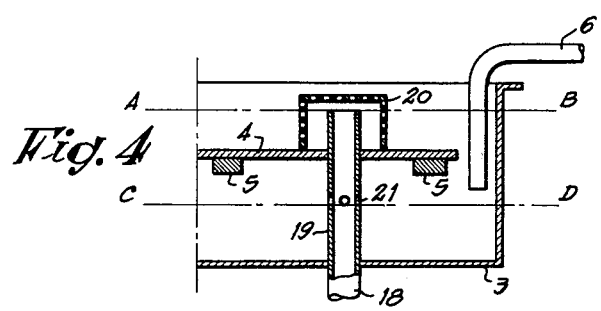
INVENTOR
Armand Malchair
BY Richards & Geier
ATTORNEYS April 28, 1964  A. MALCHAIR  3,131,064
VEGETAL COMPOSITION, METHOD AND APPARATUS FOR ITS PRODUCTION
Filed April 4, 1961  3 Sheets-Sheet 2
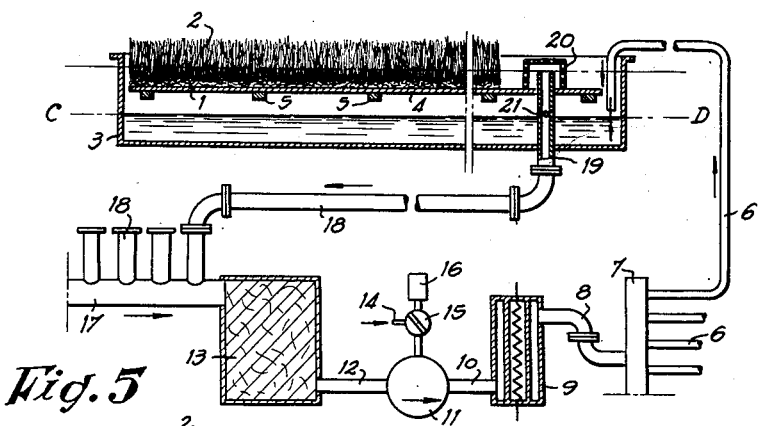
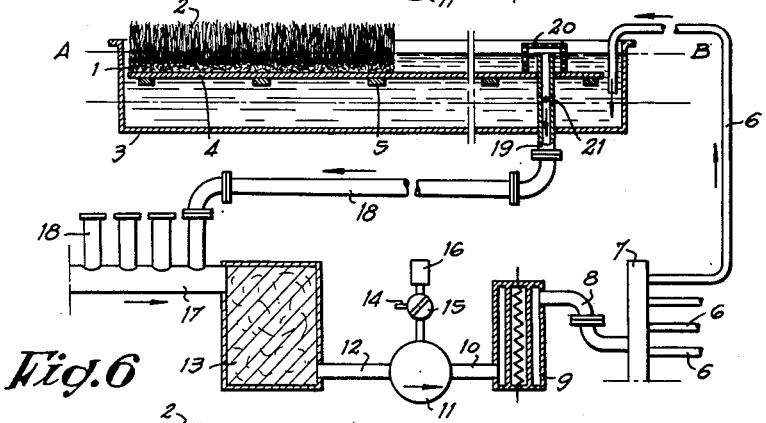
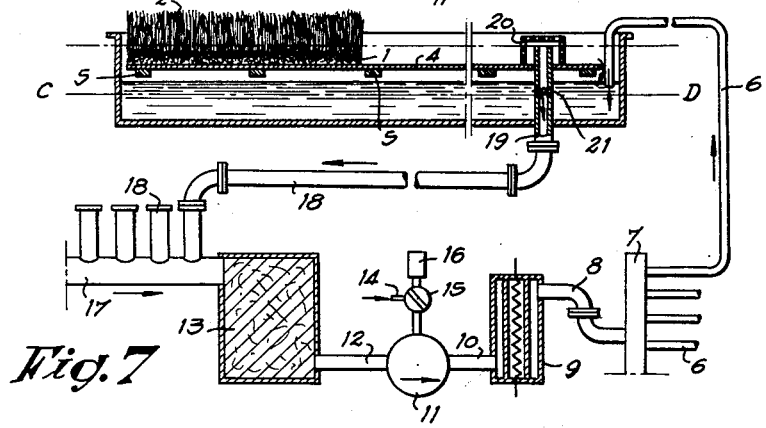
INVENTOR
Armand Malchair
BY
Richards & Geier
ATTORNEYS April 28, 1964     A. MALCHAIR     3,131,064
VEGETAL COMPOSITION, METHOD AND APPARATUS FOR ITS PRODUCTION
Filed April 4, 1961     3 Sheets-Sheet 3

Fig. 8

INVENTOR
Armand Malchair
BY
Richards & Geier
ATTORNEYS

United States Patent Office 3,131,064
Patented Apr. 28, 1964

3,131,064
VEGETAL COMPOSITION, METHOD AND
APPARATUS FOR ITS PRODUCTION
Armand Malchair, Herstal, Belgium, assignor to Bureau d'Etudes Armand Malchair, Societe Anonyme, Liege, Belgium
Filed Apr. 4, 1961, Ser. No. 100,548
Claims priority, application Belgium Apr. 4, 1960
4 Claims. (Cl. 99—2)

The present invention concerns the technique of cultivation without soil, called hydroculture.

In this technique, the grains or seeds are generally subjected to one day of soaking and are allowed two days of germination, after which the germinated grains or seeds are spread onto a rigid perforated support and are periodically watered with a nutrient solution; after a few days, the ensuing vegetation is torn off its perforated support. For facilitating this operation, the roots which project on the bottom face of aforesaid rigid support are scraped-off.

It can safely be stated that this technique of hydroculture has now reached a very satisfactory degree of perfection and that the results obtained thereby, namely for the production of fodder, can be considered as being very good indeed.

However, if the quality of the fodder obtained in this way is quite satisfactory, it is an undeniable fact that the applications of hydroculture are still very limited; it must be acknowledged in fact, that the only worthwhile success has been the production of fodder.

The present invention aims at extending considerably the possibilities of hydroculture by systematically doing away with the present unavoidable requirements such as soaking, pregermination, scraping-off the roots, and the difficulties of storage which are well known to the specialists of this kind of cultivation.

The present invention is based on an altogether novel conception which, while strictly observant of the biological conditions proper to the germination and the growth of the plants, introduces into the technique of hydroculture the quite novel concept of providing a fixed permanent support for the plants instead of the temporary support which has so far almost universally been provided by perforated rigid plates.

On account of the introduction of this notion of a permanent support, the technique of hydroculture has undergone a fundamental change and the effects therefrom as well as the results which have been obtained are far beyond any which are being obtained at present in this particular branch.

It should first be stated that the term "permanent support" is to be understood as meaning a medium of fairly loose texture, capable of absorbing freely an aqueous medium. Such support must be neutral with respect to the plant as well as with respect to the nutrient solution which is being used, and must lend itself to a free natural development and anchorage of the roots of the plants whilst forming therewith an aggregate which may even be fairly compact.

With such a permanent support as starting point, a really new vegetal composition will be obtained by hydroculture and will be essentially characterized by the fact that it consists of a combination of aforesaid permanent support, of a vegetation whose roots develop therein and of an aqueous medium under the form of a nutrient solution imbibing at the same time aforesaid support and aforesaid roots.

This permanent support will be chosen according to the particular growth which it is intended to raise, but may for instance consist of dried grass, of glucose compounds, of cakes or of any other appropriate substance. In most cases however, the support will consist of dry grass.

The vegetation which, in fact, may be of any kind, will, according to the present invention, be characterized by a feature which is quite novel in hydroculture, namely, that it is and remains unaltered in all its parts until it is being used or consumed. In other words, within the known biological limits, it will be possible to consider the vegetation obtained in this way, as being identical with that obtained from the soil, and this from the moment when it has been grown until it is being utilized.

One further surprising consequence of this new concept is that, in certain cases, it will be possible to arrange matters in such way that the permanent support will form a biological complement. In the production of fodder, this will mainly be the case when the permanent support consists of a readily eatable material, such as dried grass for instance. Under these circumstances, the new technique will produce actual blocks of fodder made up of a perfectly eatable permanent support combined with whole grass without any alteration, such blocks lending themselves to be preserved in a perfect state of freshness during exceptionally long periods, due to the presence of the nutrient solution permeating aforesaid permanent support as well as the roots.

The result of the foregoing is that the grass continues to live normally and may even grow further when stored, without impairing its nutrient properties. A first surprising consequence of this method is to be found in the fact that the plants need only stay for a very short time in the actual installation, as their further development can take place in the same way as in soil cultivation, either under natural light or artificial light radiation. Another surprising consequence of this new technique is to be found in the fact that aforesaid blocks can almost at once be cut up into separate rations of predetermined weight, each ration being fed to the animals in the same way as a ration of fresh fodder.

A further advantage of the new technique is to be found in the total absence of even the slightest loss of nutrient matter, because no separation whatever is required between the actual fodder plant and its permanent support, nor, by way of consequence, between the plant and its roots.

On account of this inseparability of the plants from their permanent support, it will be possible to introduce, for instance, into the aqueous soaking medium of aforesaid permanent support and thus into the roots of the plants connected therewith, any nutrient substance or principle, which may even be vitaminized. Also, the eatable permanent support could be treated or prepared in order to increase the nutrient or other principles, for instance by addition of glucose, of various organic matter, medicinal ingredients and such like.

It is also quite remarkable that, on account of the fact that on the one hand the period of soaking and pregermination is rendered superfluous, and that on the other hand the plants are inseparable from the support with respect to which their comportment is the same as it would be with respect to ordinary soil, the time of stay of aforesaid plants in the hydroculture medium can be considerably shortened, considering that the plants will go on growing after having been removed therefrom. And, as a consequence of this fact, the plants after having been removed from the hydrocultural medium, can freely develop further in the open air where they will have the full benefit of the atmospheric influences and specially of the solar radiations. It has been established that the results were considerably better than those obtained by application of the traditional principles of hydroculture, especially with respect to the sap rise by chlorophyllic assimilation.

This new vegetal composition can be produced by adapting the method and the installations which have already been proposed for the practice of hydroculture. All the same, it will be preferable to apply, after proper adaptation, the method and apparatus disclosed in the patent application No. 100,547, filed on April 4, 1961, on behalf of the same applicant and which will make it possible to proceed with normal production under whatever weather conditions and namely independently of sudden changes in the ambient temperature.

All these characteristics of the new vegetal composition as well as of the duly adapted aforesaid method and apparatus, will be set-off more clearly in the detailed description given below by mere way of example and without implying any restrictive feature whatever with reference to the appended drawings of which:

FIGURE 1 is a perspective view of a block of a vegetal compound according to the present invention;

FIGURE 2 is a front view of parts cut-out of the block according to FIGURE 1;

FIGURE 3 represents in a diagrammatic way the unit elements of an apparatus suitable for applying the method conforming to the present invention;

FIGURE 4 is a cross-section of a part of the apparatus represented in FIGURE 3;

FIGURES 5, 6 and 7 are diagrammatic representations of three successive phases of the method conforming to the present invention;

FIGURE 8 is a diagrammatic representation of an installation applying the apparatus which is characteristic of the present invention.

As represented in FIGURES 1 and 2, the vegetal composition according to the present invention substantially consists of a permanent support 1 of a growth 2 the roots of which become embedded in aforesaid permanent support 1 as is the case with plants grown in normal soil, and of an aqueous medium which generally contains nutrient substances and in which aforesaid permanent support 1 as well as the roots of aforesaid growth 2 are soaked. This vegetal composition is characterized by the fact that it can form a comparatively compact mass which perfectly withstands any manipulation and can be easily cut-up into pieces by means of a sharp utensil.

In the particular case when it is intended to grow fodder, the permanent support 1 will preferably be made of a comparatively thin bed of dry grass, which initially will of course be fairly loose but, once the vegetal composition, object of the present invention, has been formed, this permanent support will acquire a certain compactness and a fairly good resistance on account of the large amounts of roots and rootlets entwined therein. It will be observed, that this mass is in itself an actual fodder without any waste nor substances which can not be assimilated by the animals.

In such case, as represented diagrammatically in FIGURE 2, the cutting-up can be done immediately, for instance by means of a spade, which is a handy tool for the purpose.

If on the contrary, the vegetation which it is intended to grow consists of seedlets, each plant can easily be separated from the permanent support 1 without any damage to the stems, the leaves nor the roots, which is a considerable advantage that will be highly appreciated by all those conversant with the art.

The new process for producing such vegetal compositions substantially consists in spreading to a convenient thickness the material which is to form the permanent support; in spreading the grains or seeds over the latter, without any special preparation; and in saturating periodically aforesaid permanent support and aforesaid grains or seeds with an aqueous medium containing nutrient substances.

When the plants have reached a certain stage of development, it will be preferable to expose the vegetal composition which has thus been obtained to the solar radiation, so as to let it grow further exactly as if the vegetation were growing in normal soil.

In this method, great care should be taken that the roots and rootlets be not subjected to any dangerous variation of temperature. With this end in view and according to one of the essential characteristics of the present invention, characteristic which is quite new in the field of hydroculture, the zone which is nearest to the roots and rootlets of the vegetation must be subjected to thermal regulation within certain definite limits.

In one preferred form of embodiment of an equipment suitable for ensuring easily and economically such regulation, it is necessary to provide under the permanent support for the vegetal composition, a chamber in which the temperature will be maintained within predetermined minimum and maximum limits, whereby the temperature of the roots and rootlets themselves will forcibly be maintained, at least approximately, between those same limits.

According to the present invention, an apparatus for the production of aforesaid new vegetal composition by hydroculture and applying aforesaid new method will comprise at least one fairly shallow trough 3 the longitudinal and transverse dimensions of which can be chosen ad libitum; at a certain distance above the bottom of this trough, there is a false bottom 4 supported for instance by battens 5; one of the tubes 6 connected to a manifold 7 dips into aforesaid trough 3, the manifold being connected by a tube 8 to a heat exchanger 9. The input of the latter is connected to a pump 11 the input of which is connected to a container 13 designed so as to act as a filter. Aforesaid pump 11 comprises an air inlet 14 controlled by a motor driven valve 15. The movements of the latter, as well as the electric circuit of the driving motor (not represented) of pump 11 are controlled by a clockwork 16. A manifold 17, to which all return pipes 18 are connected, opens into the upper part of aforesaid container 13. The other end of each of these return pipes carries a tubular element penetrating through the bottom and the false bottom 4 of trough 3 and extending upward so as to reach a level A—B which is close to the upper face of the permanent support 1 onto which the grains or seeds have been spread. The upper open end of aforesaid tubular element 19 is provided with a strainer 20 and the wall of this tubular element has a series of small holes 21 provided at the level C—D reached by the liquid during the heating phase of the operating cycle.

The operating cycle which characterizes the method of the present invention takes the following course, as represented diagrammatically in FIGURES 5, 6 and 7: considering that a bed of dried grass constituting the permanent support has been spread into the false bottom 4, and that over this bed a layer of grains or seeds has been spread, the protection of these grains or seeds, of the germs and of the roots and rootlets against dangerous variations of temperature is secured by putting into circulation a liquid medium, which generally is water to which nutrient substances have been added, through the circuit comprising the filtering container 13, pipe 12, pump 11, pipe 10, the heat exchanger 9, pipe 8, manifold 7, the corresponding pipe 6, that part of trough 3 which is comprised below the level C—D, the openings 21 of the tubular element 19, the return pipe 18 and the manifold 17. In order to maintain the regulating liquid at the maximum level C—D in the trough 3, the air inlet 14 is opened to the required extent, which so to say regulates the rate of delivery of the pump. The water-air mixture is forced at reduced rate into the trough 3, whereby the openings 21 of the tubular element act as an overflow. The returning liquid is filtered in container 13, whilst the temperature of the water-air mixture can be properly regulated by means of some known form of thermostat or aquastat inserted into the circuit and controlling the switching-on and off of the resistance heaters of the heat exchanger 9. Under these circumstances, whatever the ambient temperature may be, the permanent support 1 as well as the grains or seeds, the roots and rootlets will always be maintained at an optimum temperature and will at any rate be protected against all dangerous variations of temperature. For the purpose of saturating periodically with the nutrient solution aforesaid permanent support and the elements which it contains, all that is necessary is to include into the program of the operating cycle a periodic closing of the motor driven valve 15 so as to close the air inlet 14 of pump 11. The rate at which the latter will be discharging water thereby increases and the level of the liquid medium in trough 3 will rise, considering that the openings 21 provided in the tubular element 19 cannot cope with this increased rate of flow. The liquid thus reaches the level A—B which is approximately at the same height as the upper face of the permanent support 1 of the vegetal composition.

The excess of liquid medium flows away through the top of the tubular element 19 which thus acts as a constant level device.

Finally, when the soaking has lasted long enough, the motor driven valve 15 is put once more into action through the clockwork device 16 and opens in a duly controlled way the air inlet 14 of the pump. The rate of discharge of the latter will thus diminish once more and the liquid medium will therefore recede below the false bottom 4 until it reaches the level C—D, i.e., the level of the heat regulation phase.

The method and the equipment which have been described above, can be applied in many different forms, either in large rooms, or in smaller rooms or even in appropriate booths.

In a general way, the method and the apparatus conforming to the present invention will preferably be made part of an installation comprising the supply rooms, the rooms for hydroculture, the spaces which may be provided for exposing the vegetation to solar radiation, storage, distribution and forwarding rooms. In certain applications, special packing rooms can also be provided, namely for the dispatch of seedlings.

It is obvious that the apparatus described above can be supplemented by all kinds of subsidiary equipment of some known type or other for general heating of the rooms, lighting by means of special lamps, handling and subsidiary operations.

By way of general indication, and without implying any restrictive considerations whatever, FIGURE 8 shows in a diagrammatic way an assembly which applies the apparatus object of the present invention, and is suitable for a rational development of the method.

In this installation, which is represented diagrammatically, the same numbers refer to the same elements which have been represented in the preceding figures.

In a most general way, the present invention concerns the new vegetal composition as such, the particular application of this vegetal composition to the cultivation of flowering plants, fodder plants, as well as medicinal or other plants which must be pricked-out as seedlings; the invention also concerns the very particular application of the same vegetal composition under the form of a comparative compact mass, consisting of a permanent support of dried grass, and of fresh grass planted in aforesaid permanent support in the same way as a plantation in normal soil, aforesaid compact mass lending itself to be cut into separate rations which can easily be estimated; finally, the present invention concerns the procedure as described above, the material and all and sundry installations applying the latter.

What I claim is:

1. A method for the production of a vegetal composition which comprises providing a plain solid non-perforated supporting surface, spreading a layer of dried grass on said supporting surface to establish a support bed having a pervious structure, spreading grass seed on said support bed, periodically submerging said support bed and grass seed in a solution consisting of water and nutrient substances to promote growth of the grass seed and cause the roots thereof to become embedded in said support bed, and circulating a heated fluid under said supporting surface during periods when said support bed and said grass seed are not submerged in said solution to control the temperature of said support bed and said grass roots, said fluid being the same solution used for submerging the support bed and grass seed, the fluid being admixed with air to oxygenate the nutrient substances therein.

2. A method for the production of a vegetal composition which comprises providing a plain solid non-perforated supporting surface, spreading a layer of dried grass on said supporting surface to establish a support bed having a pervious structure, spreading grass seed on said support bed, periodically submerging said support bed and grass seed in a solution consisting of water and nutrient substances to promote growth of the grass seed and cause the roots thereof to become embedded in said support bed, circulating a heated fluid under said supporting surface during periods when said support bed and said grass seed are not submerged in said solution to control the temperature of said support bed and said grass roots, said fluid being the same solution used for submerging the support bed and grass seed, the fluid being admixed with air to oxygenate the nutrient substances therein, removing the support bed and growth of grass from said supporting surface, and exposing them to solar radiation for completing the growth of chlorophyllous photo-synthesis.

3. Apparatus for hydroponically producing vegetal compositions comprising a trough having a flat bottom, a solid non-perforated false bottom supported in said trough a distance above said flat bottom, a heat exchanger having inlet and discharge openings, conduit means connected to the discharge of said heat exchanger and extending into said trough, a pump having suction and discharge openings, conduit means connecting the discharge opening of said pump with the inlet of said heat exchanger whereby liquid may be pumped through said heat exchanger and into said trough, an air valve connected to said pump for admitting air thereto, means for selectively opening and closing said air valve, means for actuating the last-mentioned means, a filter having an inlet and a discharge opening, conduit means connecting the discharge opening of said filter with the suction opening of said pump, a tubular element extending through the bottom of said trough and through said false bottom and above said false bottom to the highest liquid level in said trough, said tubular elements having lateral openings located between said false bottom and the bottom of said trough, and conduit means connecting said tubular element to the inlet of said filter.

4. A hydroponically produced vegetal fodder for animals comprising in combination with a support bed of loose dried comestible grass having a pervious structure, a growth of comestible grass having roots embedded within the structure of said support bed and holding together said loose dried grass to form a compact support bed, and an aqueous medium containing nutrient substances dispersed in said support bed and said roots and retained by capillarity therein.

References Cited in the file of this patent

UNITED STATES PATENTS

| | | |
|---|---|---|
| 776,139 | Luebben | Nov. 29, 1904 |
| 2,358,000 | Cornell | Sept. 12, 1944 |
| 2,971,290 | Kyle | Feb. 14, 1961 |

FOREIGN PATENTS

| | | |
|---|---|---|
| 13,067 | Great Britain | of 1912 |
| 461,018 | Canada | Nov. 15, 1949 |

OTHER REFERENCES

Ellis et al.: Soilless Growth of Plants, N.Y., Reinhold, 1947. Pages 48 and 55 through 60. SB 139.E5 (1947).